United States Patent
US 11,809,953 B1
Jacob et al.
Nov. 7, 2023

(54) DYNAMIC CODE LOADING FOR MULTIPLE EXECUTIONS ON A SEQUENTIAL PROCESSOR

(71) Applicant: Amazon Technologies, Inc., Seattle, WA (US)

(72) Inventors: Samuel Jacob, Fremont, CA (US); Ilya Minkin, Los Altos, CA (US); Mohammad El-Shabani, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/902,702

(22) Filed: Sep. 2, 2022

Related U.S. Application Data

(63) Continuation of application No. 16/457,268, filed on Jun. 28, 2019, now Pat. No. 11,461,622.

(51) Int. Cl.
G06F 1/00 (2006.01)
G06N 3/063 (2023.01)
G06N 5/04 (2023.01)

(52) U.S. Cl.
CPC .............. *G06N 3/063* (2013.01); *G06N 5/04* (2013.01)

(58) Field of Classification Search
CPC .................................... G06F 3/63; G06F 5/04
USPC ........................................................ 706/61
See application file for complete search history.

(56) References Cited

U.S. PATENT DOCUMENTS

| 6,298,396 | B1 | 10/2001 | Loyer et al. | |
|---|---|---|---|---|
| 10,891,136 | B1* | 1/2021 | Sodani | G06F 9/3877 |
| 11,281,967 | B1* | 3/2022 | Volpe | G06N 3/063 |
| 11,321,329 | B1* | 5/2022 | Shih | G06F 18/213 |
| 2008/0222317 | A1 | 9/2008 | Go et al. | |
| 2018/0300634 | A1* | 10/2018 | McBride | G06F 9/5033 |
| 2019/0180170 | A1 | 6/2019 | Huang et al. | |
| 2019/0197001 | A1* | 6/2019 | Han | G06F 3/0659 |
| 2019/0340490 | A1* | 11/2019 | Fishel | G06N 3/045 |
| 2019/0340491 | A1* | 11/2019 | Norden | G06N 3/04 |
| 2020/0104691 | A1* | 4/2020 | Bai | G06N 3/084 |

(Continued)

OTHER PUBLICATIONS

PCT/US2020/039795, "International Search Report and Written Opinion", dated Oct. 7, 2020, 18 pages.

(Continued)

*Primary Examiner* — Volvick Derose
(74) *Attorney, Agent, or Firm* — Kilpatrick Townsend & Stockton LLP

(57) ABSTRACT

Embodiments include techniques for enabling execution of N inferences on an execution engine of a neural network device. Instruction code for a single inference is stored in a memory that is accessible by a DMA engine, the instruction code forming a regular code block. A NOP code block and a reset code block for resetting an instruction DMA queue are stored in the memory. The instruction DMA queue is generated such that, when it is executed by the DMA engine, it causes the DMA engine to copy, for each of N inferences, both the regular code block and an additional code block to an instruction buffer. The additional code block is the NOP code block for the first N−1 inferences and is the reset code block for the $N^{th}$ inference. When the reset code block is executed by the execution engine, the instruction DMA queue is reset.

20 Claims, 10 Drawing Sheets

(56) References Cited

U.S. PATENT DOCUMENTS

2022/0138021 A1* 5/2022 Rimmer ................. G06F 9/545
                                                                    718/105
2022/0138551 A1* 5/2022 Marani ................... G06N 3/08
                                                                    706/25

OTHER PUBLICATIONS

PCT/US2020/039795, "International Preliminary Report on Patentability", dated Jan. 6, 2022, 13 pages.
U.S. Appl. No. 16/457,268, Notice of Allowance, dated Jun. 2, 2022, 9 pages.
U.S. Appl. No. 16/457,268, Corrected Notice of Allowability, dated Jun. 14, 2022, 6 pages.

* cited by examiner

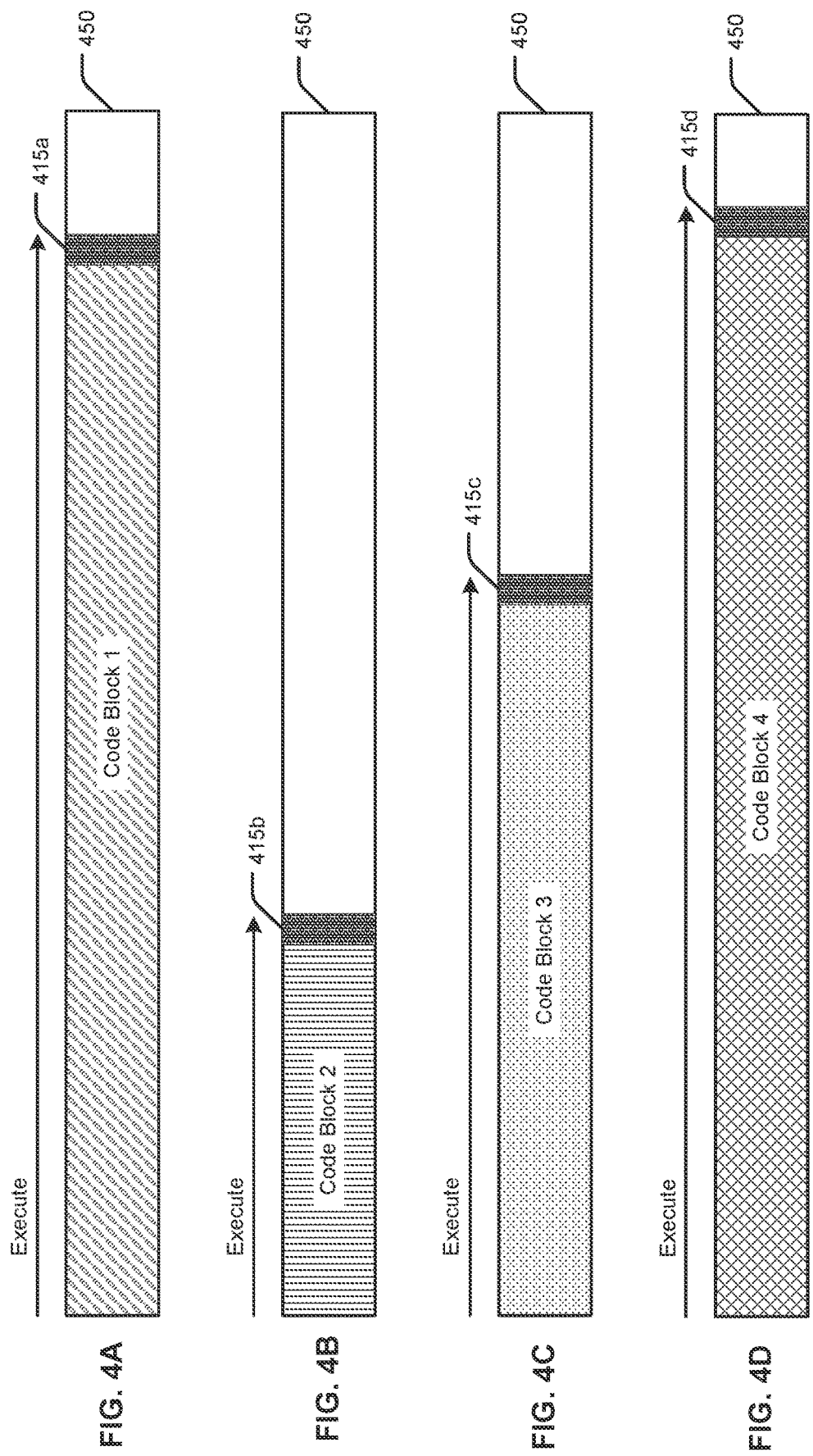

DYNAMIC CODE LOADING FOR MULTIPLE EXECUTIONS ON A SEQUENTIAL PROCESSOR

CROSS-REFERENCE TO RELATED APPLICATION

This application claims priority to and is a continuation of U.S. patent application Ser. No. 16/457,268, filed Jun. 28, 2019, now U.S. Pat. No. 11,461,622 issued on Oct. 4, 2022, and entitled "DYNAMIC CODE LOADING FOR MULTIPLE EXECUTIONS ON A SEQUENTIAL PROCESSOR," the content of which is hereby incorporated by reference in its entirety for all purposes.

BACKGROUND

In a computing system, an instruction buffer is generally used to store instructions that may be decoded and executed by an execution engine, such as a processing unit. For example, an artificial neural network, such as a deep neural network, may include multiple layers of processing nodes. Each processing node on a layer can perform computations on input data generated by processing nodes on the preceding layer to generate output data. For example, a convolutional neural network may include multiple convolution layers, activation layers, and pooling layers, where each of the layers may be implemented using an execution engine, such as a convolution engine, an activation engine, a pooling engine, or a stream processor. Each of these execution engines may use an instruction buffer to temporarily store instructions to be decoded by an instruction decoder and executed by an execution unit of the execution engine to perform various functions. In general, a neural network may be developed, trained, and made available to many end users. The end users can then use the trained neural network to perform various tasks (which may be referred to as the inference process) on input data.

Due to hardware limitations, the size of the instruction buffer may be smaller than the size of the instruction code used to perform a user function, such as an inference. Therefore, the instruction buffer may need to be refilled during each inference. In addition, because the user function (e.g., the inference process) may be performed continuously for different sets of input data, the instruction code for the user function may need to be reloaded into the instruction buffer for each inference. In general, it is desirable that the instruction buffer can be refilled while the execution engine is executing some other instructions stored in the instruction buffer, such that the user function can be performed more quickly and more efficiently using the available resources of the computing system.

Instructions may be transferred into the instruction buffer using a direct memory access (DMA) engine. In some instances, the DMA engine copies a section of the instruction code stored in memory (e.g., dynamic random-access memory (DRAM)) into the instruction buffer based on an entry in a DMA queue. The DMA engine may be triggered to copy the code section when the execution engine executes a particular instruction added to the instruction code. Alternatively or additionally, a hardware logic of the execution engine may cause the DMA engine to copy the section of the instruction code into the instruction buffer when the hardware logic determines that the free space in the instruction buffer is greater than a threshold value. Instruction transfers may be split into multiple blocks and each block may include an instruction to fetch the next block by triggering a DMA transaction which would refill the instruction buffer using the DMA engine.

BRIEF DESCRIPTION OF THE DRAWINGS

Various embodiments in accordance with the present disclosure will be described with reference to the drawings, in which:

FIGS. 4A-4D illustrate an example of refilling an instruction buffer.

DETAILED DESCRIPTION

Figure 1:
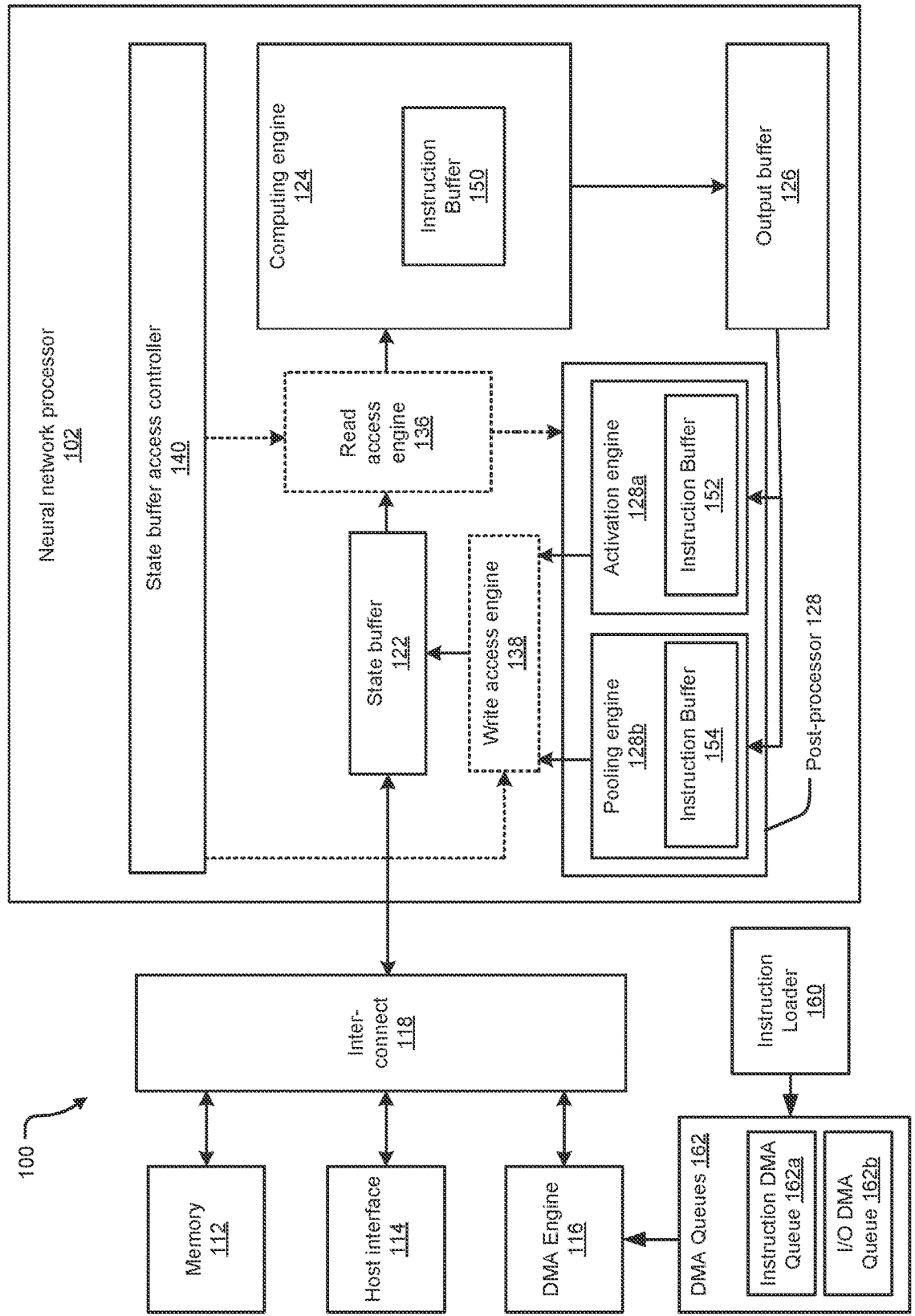
FIG. 1 illustrates an example of an apparatus for implementing a neural network.

Artificial neural networks (alternatively referred to herein as "neural networks") are computing systems with an architecture based on biological neural networks. Such neural networks may be implemented using special-purpose neural network processors employing one or more execution engines. To ensure proper functioning of an execution engine while executing instructions associated with a neural network, one or more direct memory access (DMA) queues may be maintained. An instruction DMA queue may cause a DMA engine to transfer instructions between a memory device and the execution engine's instruction buffer. An input/output (I/O) DMA queue may allow input and output tensors generated during an inference to be carried over between execution of different nodes or layers associated with the neural network. Because the instruction DMA queue and the I/O DMA queue may only have space for N inferences, they need to be reset after N inferences in order for additional inferences to be performed.

One approach to reset the DMAs queue after N inferences is to insert a conditional instruction into the instruction code executed by the execution engine. However, many execution engines are sequential processors which lack the capability to perform flow control, such as the performance of conditional instructions (e.g., IF statements, FOR loops, WHILE loops, etc.). Another approach is to involve a processor that is external to the neural network processor. The external processor may periodically check whether N inferences have been performed, and in response to determining that this condition is satisfied, causing the DMA queues to reset. This approach is undesirable due to the computational burden on the external processor as well as on the neural network processor.

Another approach is to store N copies of the instruction code for a single inference in the memory device that the DMA engines load instructions from, and to include an instruction for resetting the DMA queues after the instructions for the $N^{th}$ inference. This would require significant storage space and would restrict the size and maximum performance capability of the neural network.

Embodiments described herein allow resetting the instruction DMA queue and the I/O DMA queue after N inferences of a neural network without either the involvement of an external processor during execution or storing N copies of the instruction code for a single inference. Instead of duplicating the code block N times, an entry in the instruction DMA queue for transferring the code block to the instruction buffer is duplicated N times. This pushes the condition evaluation from execution time to load time, allowing the external processor to create appropriate DMA descriptors prior to execution time.

In some embodiments of the present disclosure, two instruction blocks are dynamically created at runtime and stored in a memory device. The two instruction blocks include (1) a no-operation (NOP) block and (2) a reset block that contains code to reset the instruction DMA queue and/or the I/O DMA queue. In various embodiments, the NOP block may be equal or different in size than the reset block. In some embodiments, the NOP block may include the same number of descriptors as the reset block (e.g., two) or, in other embodiments, may not include any descriptors. Additionally, a regular code block containing instruction code corresponding to a single inference of the neural network may be stored in the memory device.

In some embodiments, the instruction DMA queue may be filled with entries that determine which code blocks are transferred by the DMA engine from the memory device to the instruction buffer. For the first inference, the DMA engine may first copy the regular code block followed by the NOP block. For the second inference, as well as for each inference up to N−1 inferences, the DMA engine may again first copy the regular code block followed by the NOP block. For the $N^{th}$ inference, the DMA engine may first copy the regular code block followed by the reset block.

During execution of the code blocks by the execution engine, the I/O DMA queue may allow the DMA engine to copy I/O data for each of the N inferences. In some instances, the regular code block may be split into multiple regular code blocks that are loaded sequentially into the instruction buffer. The size of each of the split regular code blocks may be less than the size of the instruction buffer. After each split regular code block is executed by the execution engine, the DMA engine may look to entries in the I/O DMA queue to transfer the output data so that it may be used as input data for the next split regular code block. In some embodiments, the execution engine may be reset during execution of the NOP block for one or more of the N inferences. When the execution engine executes the reset block, one or both of the instruction DMA queue and the I/O DMA queue are reset. This may include clearing the entries and generating new entries for the next N inferences.

In some embodiments, switching between execution of the NOP block and the reset block for different inferences enables N inferences to be executed on the execution engine without the involvement of an external processor during execution. As an example, when the regular code blocks are split into multiple regular code blocks, each split regular code block may include a refill instruction at the end thereof that causes a single DMA descriptor to be fetched (for the next split regular code block), except for the final split regular code block, which may include a refill instruction that causes two DMA descriptors to be fetched, one for the next split regular code block and another for an additional block (the NOP block or the reset block). If the NOP block were not used, an external processor would need to interfere and modify the refill instructions to change the number of DMA descriptors to be fetched for either the first N−1 inferences or for the $N^{th}$ inference.

The execution engine may include a pipeline that includes instruction fetch, decode, and execution stages. In some execution cycles, the execution stage may perform, for example, arithmetic instructions (add, subtract, shift, etc.) without accessing a memory, and thus the instruction fetch from a storage device may be performed simultaneously with the execution of the arithmetic instructions. In some execution cycles, the instructions may include a memory operation, and thus a new instruction may not be fetched from the storage device when the execution stage is performing the memory operation. In many cases, the instruction buffer may be much smaller than the size of the instruction code for performing a certain function, such as an inference. Thus, a mechanism may be utilized to determine whether the instruction buffer has space available and load new instructions into the instruction buffer when the instruction buffer has space available for storing new instructions and before the instruction buffer becomes empty, such that the execution stage may continuously execute instructions stored in the instruction buffer. In some embodiments, the instruction buffer is reset after each of the N inferences.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of an apparatus 100 for implementing a neural network. The apparatus 100 may be part of a computer system, such as a data center server. In some embodiments, the apparatus 100 may be part of a multi-tenant compute service system (e.g., a cloud) and may communicate with a host device (not shown in FIG. 1) to provide computing and memory resources for a computing service. The apparatus 100 may include a neural network processor 102 coupled to a memory 112, a DMA engine 116, and a host interface 114 via an interconnect 118. The neural network processor 102 may provide computing resources to support inference using a trained neural network.

The memory 112 may be configured to store the instructions, input data (e.g., pixel data of images), and the weights (e.g., the filter data) or other parameters of the trained neural network received from, for example, the host device. The memory 112 may also be used to store the output of the neural network processor 102 (e.g., one or more image recognition decisions on the input images) or some intermediary data. The memory 112 may include any suitable memory, such as dynamic random access memory (DRAM), synchronous DRAM (SDRAM), double data rate DRAM (DDR DRAM), storage class memory (SCM), flash memory devices, etc.

The DMA engine 116 may be configured to perform DMA operations to transfer data between the neural network processor 102 and the host device or the memory 112. For example, the host device may store the instructions, input data, the weights, and other parameters of the neural network at the memory 112. The host device may provide the memory addresses for the stored instructions, data, weights, and other parameters of the neural network to the neural network processor 102 (e.g., in the form of memory descriptors). The neural network processor 102 may then obtain the stored instructions, data, weights, or other parameters of the neural network using the DMA engine 116 based on the memory addresses provided by the host device. The neural network processor 102 may also store the results of computations (e.g., one or more image recognition decisions or intermediary data) at the memory 112, and provide the memory addresses for the stored results to the host device.

The host interface 114 may enable communications between the host device and the neural network processor 102. For example, the host interface 114 may be configured to transmit the memory descriptors including the memory addresses of the stored data (e.g., input data, weights, results of computations, etc.) between the host device and the neural network processor 102. The host interface 114 may include, for example, a peripheral component interconnect express (PCIe) interface or any suitable interface for communicating with the host device.

The neural network processor 102 may provide the computing resources to support the neural network computations for inference, such as image classification. In the example shown in FIG. 1, the neural network processor 102 may include an integrated circuit, such as a system-on-chip (SoC), FPGA, or ASIC. The neural network processor 102 may include a number of circuit components, such as a state buffer 122, a computing engine 124, an output buffer 126, and a post-processor 128. In some implementations, the neural network processor 102 may also include a read access engine 136 and a write access engine 138 to provide the computing engine 142 and the post-processor 128 with read and write access to the state buffer 122 as discussed in detail below.

The state buffer 122 may be configured to provide caching of data used for computations at the computing engine 124. The data cached at the state buffer 122 may include, for example, the input data and weights obtained from the memory 112, output data from the computing engine 124, and/or output data from the post-processor 128. The caching may reduce the effect of memory access bottleneck (e.g., caused by the latencies at the memory 112, the DMA engine 116, the interconnect 118, etc.) on the performance of the computing engine 124. The state buffer 122 may be an on-chip memory device and may include, for example, static random access memory (SRAM). In some embodiments, the state buffer 122 may be partitioned based on the organization of the computing engine 124. For example, the state buffer 122 may include multiple SRAM banks, where each bank may be configured to store input data and weights for a row of the computing engine 124.

The computing engine 124 may include an array of processing elements (PEs) configured to perform one or more arithmetic operations (e.g., vector multiplication) for neural network computations. In some implementations, computing engine 124 may be a matrix multiplication unit that may be used for matrix convolution and/or matrix multiplication, and thus may be used to implement a convolution layer or a fully-connected layer. For example, in some implementations, the computing engine 124 may include a systolic array that includes a two-dimensional array of processing elements arranged in rows and columns.

The post-processor 128 may be configured to perform post-processing on the outputs of the computing engine 124 (which may act as a neural network layer, such as a convolution layer or fully-connected layer) that may be stored in the output buffer 126 to generate final outputs for the neural network layer. In the example shown in FIG. 1, the post-processor 128 may include an activation engine 128a and a pooling engine 128b. The activation engine 128a may perform one or more activation (non-linear) functions, such as tanh, sigmoid, ReLU, etc., on the outputs of a convolution layer to generate the output data, and store the output data at the state buffer 122. In some implementations, the activation engine 128a may include one or more multiplier circuits. The pooling engine 128b may perform, for example, maximum pooling, average pooling, etc., on the outputs of a convolution layer or the activation engine 128a to generate subsamples, and store the subsamples at the state buffer 122. In some implementations, the pooling engine 128b may also include one or more multiplier circuits. The pooling engine 128b and/or the activation engine 128a may also be controlled to be skipped for certain convolution layers. For example, as discussed above, a CNN may perform multiple convolution and ReLU operations before performing a pooling operation.

In some implementations, the post-processor 128 may also include a Softmax engine (not shown in FIG. 1) that can perform a Softmax function on the output of the fully-connected layer. As described above, the Softmax engine may take a vector of real-valued scores from a fully-connected layer and map the vector of real-valued scores to a vector of probability values between zero and one that sum to one.

The read access engine 136 may provide read access to the state buffer 122 for a read access requesting device including, for example, the computing engine 124 and the post-processor 128. The write access engine 138 may provide write access to the state buffer 122 for a write access requesting device including, for example, the post-processor 128. Each of the read access engine 136 and the write access engine 138 may convert a sequential series of access operations (e.g., multiple read or write operations across multiple clock cycles) to a single access operation to reduce power and reduce wait latency. Each of the read access engine 136 and the write access engine 138 may be organized based on the state buffer 122. For example, each of the read access engine 136 and the write access engine 138 may include multiple sub-engines corresponding to multiple SRAM banks of the state buffer 122, with each sub-engine providing access to a corresponding SRAM bank. A sub-engine of the read access engine 136 may convert a sequential series of read access operations to a corresponding SRAM bank for multiple data elements (e.g., by a row of the computing engine 124 or by the post-processor 128) to a single read access for the multiple data elements. A sub-engine of the write access engine 138 may also convert a sequential series of write accesses for storing multiple data elements at the corresponding SRAM bank (e.g., by the post-processor 128) to a single write access for the multiple data elements.

In some embodiments, the neural network processor 102 may also include a stream processor (not shown in FIG. 1) that handles the parallel processing and coordinates the operations of the different execution engines in the neural network processor 102. Each of the computing engine 124, the activation engine 128a, the pooling engine 128b, and the stream engine may include an instruction buffer that temporally stores the instruction code to be executed by the respective execution engine. For example, the computing engine 124 may include an instruction buffer 150, the activation engine 128a may include an instruction buffer 152, and the pooling engine 128b may include an instruction buffer 154. Each instruction buffer may be connected to interconnect 118 that is connected to a storage device (e.g., the memory 112) and a DMA engine (e.g., DMA engine 116) as described above. Each of the computing engine 124, the activation engine 128a, the pooling engine 128b, and the stream engine may also include an instruction decoder (not shown in FIG. 1) for decoding each instruction into opcodes or a set of signals that drive other components in the respective execution engine.

According to certain embodiments, an instruction loader 160 may split the instruction code used by an execution engine (e.g., the computing engine 124, the activation engine 128a, or the pooling engine 128b) to perform a user function (e.g., an inference) into multiple sections, where the size of each section is less than the size of the instruction buffer, such as less than or equal to a half of the size of the instruction buffer. An instruction DMA queue 162a (alternatively referred to as a "refill DMA ring") may be created by the instruction loader 160 based on the splitting of the instruction code and based on the number of inferences N, where each entry in the instruction DMA queue 162a may correspond to one section of the instruction code and may be used to load the section of the instruction code into the instruction buffer using the DMA engine 116. Software or hardware based methods may use the instruction DMA queue 162a to automatically refill the instruction buffer. In some embodiments, the instruction loader 160 is part of a runtime driver that determines the number of inferences N based on a configuration option that a user sets for the runtime driver.

For example, in some embodiments, an instruction may be added into some sections of the multiple sections of instruction code. The instruction, when executed by the execution engine (e.g., computing engine 124, activation engine 128a, or pooling engine 128b), may cause the DMA engine 116 to copy one or more sections of the instruction code into the instruction buffer based on one or more entries in the instruction DMA queue 162a. For example, the instruction may increase the value of a head pointer of the instruction DMA queue 162a, which may cause the DMA engine 116 to execute one or more entries in the instruction DMA queue 162a. In some embodiments, a hardware logic can be added in each execution engine (e.g., the computing engine 124, the activation engine 128a, or the pooling engine 128b) to cause the DMA engine 116 to copy one or more sections of the instruction code into the corresponding instruction buffer based on one or more entries in the instruction DMA queue 162a, when the free space in the instruction buffer is greater than a threshold value. In some embodiments, the instruction DMA queue 162a may be restarted to load the same instruction code into the instruction buffer to repeatedly execute the instruction code for different input data (e.g., for inferences based on different input data).

In some embodiments, an I/O DMA queue 162b (alternatively referred to as a "I/O DMA ring") may be created by the instruction loader 160 based on the splitting of the instruction code and based on the number of inferences N. The entries in the I/O DMA queue 162b allow the DMA engine 116 to copy the output data generated by the execution of one section of the instruction code and to provide the data as input data for the execution of the next section of the instruction code.

Figure 2:
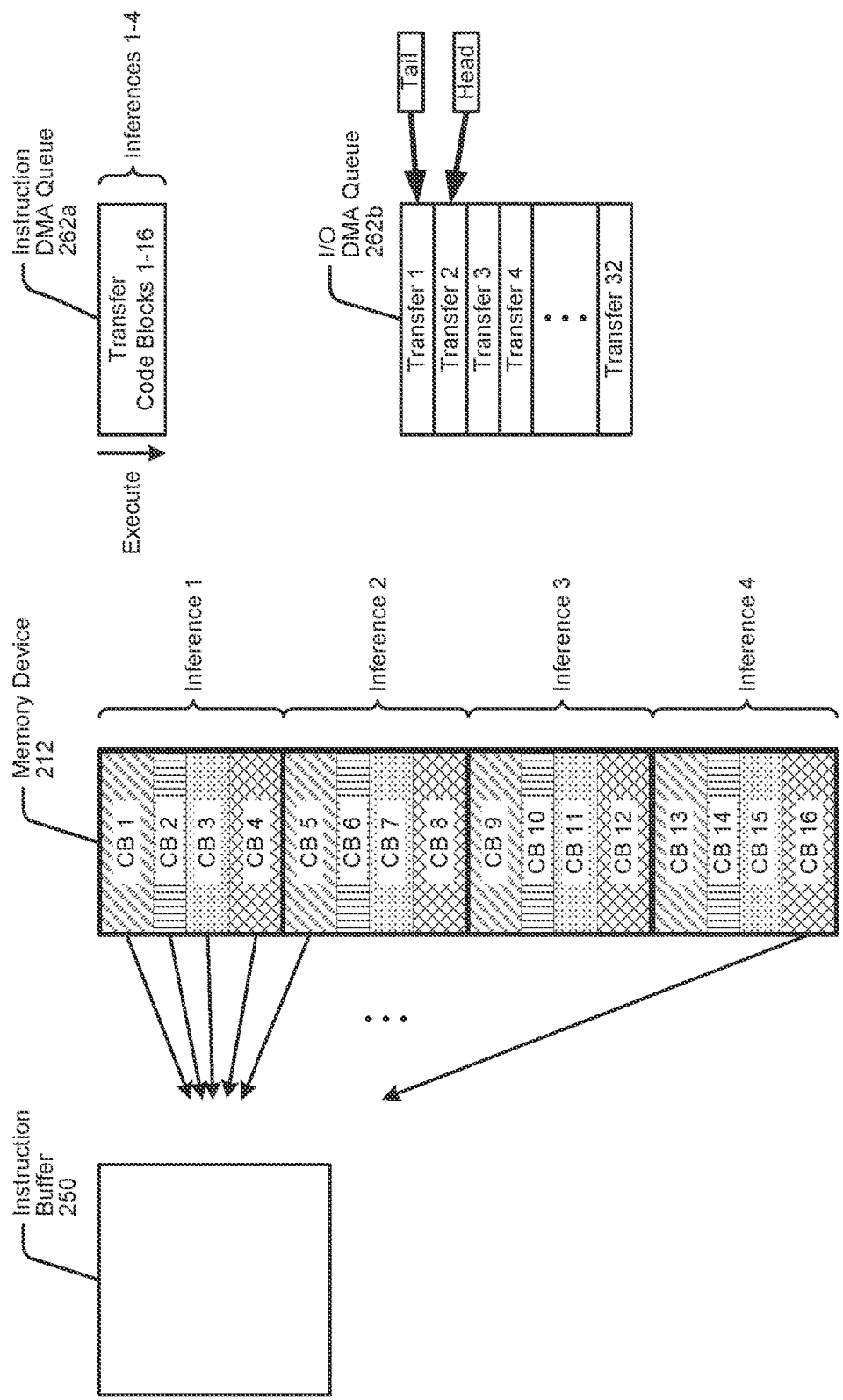
FIG. 2 illustrates an example approach for enabling execution of multiple inferences on an execution engine.

FIG. 2 illustrates an example approach for enabling execution of multiple inferences on an execution engine. In the illustrated example, the number of inferences N is equal to 4. Code instructions for performing the first inference are contained in regular code blocks 1-4. Code instructions for performing the second, third, and fourth inferences are contained in regular code blocks 5-8, 9-12, and 13-16, respectively. Because each inference is the same, regular code blocks 1-4 may be identical to each of regular code blocks 5-8, 9-12, and 13-16. Regular code blocks 1-16 may be stored in a memory device 212, which may be a DRAM device. An instruction DMA queue 262a is generated with multiple entries that cause regular code blocks 1-16 to be sequentially loaded into an instruction buffer 250. An I/O DMA queue 262b is generated with multiple entries that allow the input and output data generated during execution of regular code blocks 1-16 to be properly handled.

Figure 3A:
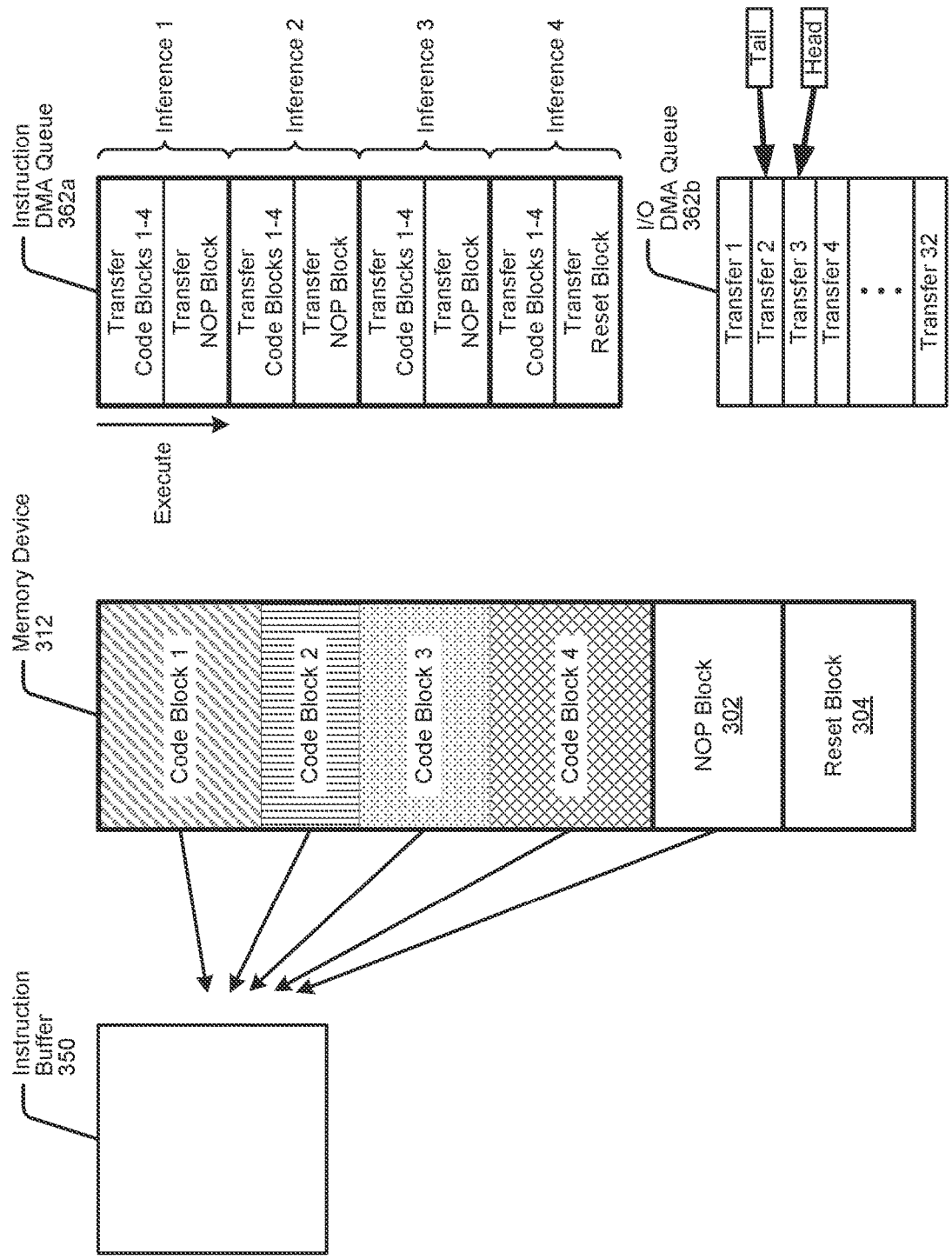
FIGS. 3A and 3B illustrate an example approach for enabling execution of multiple inferences on an execution engine.
Figure 3B:
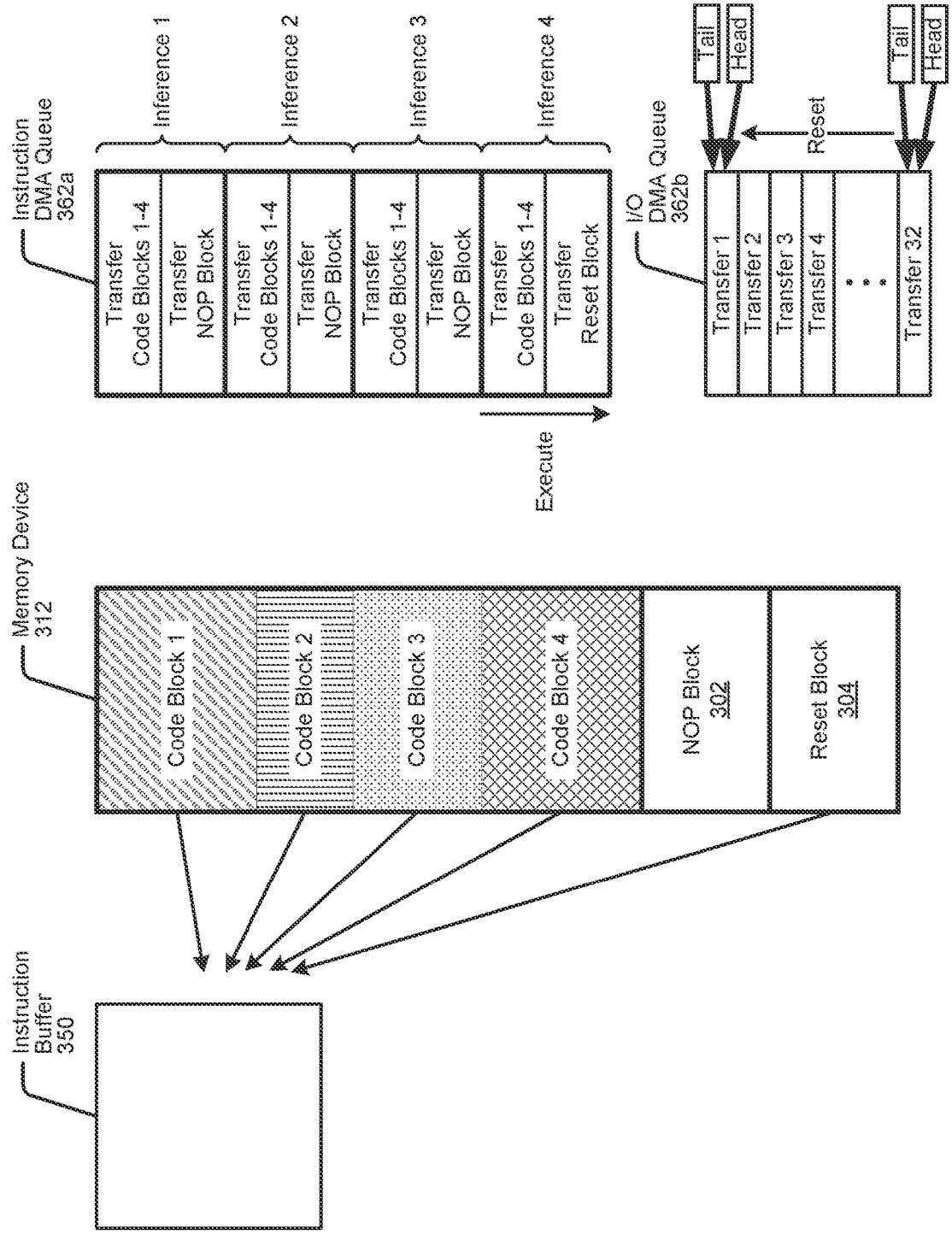

FIGS. 3A and 3B illustrate an example approach for enabling execution of multiple inferences on an execution engine. In the illustrated example, the number of inferences N is equal to 4. Code instructions for performing each inference are contained in regular code blocks 1-4. Regular code blocks 1-4 may be stored in a memory device 312, which may be a DRAM device. A NOP block 302 and a reset block 304 may be generated and stored in the memory device 312.

An instruction DMA queue 362a is generated with multiple entries that cause regular code blocks 1-4 and an additional code block to be sequentially loaded into an instruction buffer 350 for each of the 4 inferences (N inferences). As shown in reference to FIG. 3A, for each of the first, second and third inferences (first N−1 inferences of the N inferences), regular code blocks 1-4 are loaded into the instruction buffer 350 followed by the NOP block 302. As shown in reference to FIG. 3B, for the $N^{th}$ inference, regular code blocks 1-4 are loaded into the instruction buffer 350 followed by the reset block 304.

An I/O DMA queue 362b is generated with multiple entries that allow the input and output data generated during execution of regular code blocks 1-4 for each inference to be properly handled. For example, after the execution engine executes code block 1, an entry of the I/O DMA queue 362b may cause the DMA engine to transfer the output data of code block 1 to become the input data of code block 2. Similarly, after the execution engine executes code block 2, an entry of the I/O DMA queue 362b may cause the DMA engine to transfer the output data of code block 2 to become the input data of code block 3, and so on. In some embodiments, for each transfer of I/O data, the I/O DMA queue 362b may include two entries, one corresponding to the input data and another corresponding to the output data. Accordingly, for the example illustrated in FIGS. 3A and 3B, the I/O DMA queue 362b may include 32 entries.

A head pointer and a tail pointer may be maintained for the I/O DMA queue 362b. The head pointer may indicate the next transfer instruction to be carried out by the DMA engine and the tail pointer may indicate the last transfer instruction to be carried out by the DMA engine. In some embodiments, instructions may be inserted into the code blocks to cause the head pointer to be incremented. When it is detected that the head pointer is not aligned with the tail pointer, the DMA engine may perform the transfers indicated in the entries to which the tail pointer is aligned until the tail pointer becomes aligned with the head pointer. In some embodiments, the instruction DMA queue 362a may utilize a head pointer and a tail pointer in a similar manner to that described for I/O DMA queue 362b.

During the $N^{th}$ iteration, the execution engine executes the reset block 304, causing one or both of the instruction DMA queue 362a and the I/O DMA queue 362b to reset. This may include clearing the entries in the DMA queues, generating new entries in the DMA queues for an additional N inferences, and/or resetting the head pointer and tail pointer to become aligned with the first entry in the DMA queues. For example, after the N inferences, both the head pointer and the tail pointer may be aligned with the last entry in the I/O DMA queue 362b. Execution of the reset block 304 may move the head pointer and the tail pointer to become aligned with the first entry in the I/O DMA queue 362b or may create new instances of the pointers that are initialized to be aligned with the first entry.

FIGS. 4A-4D illustrate an example of refilling an instruction buffer 450. In some embodiments, a refill instruction 415 may be added at the end of each of the code blocks. As shown in FIG. 4A, to perform the user function, the instruction buffer 450 may first be filled with code block 1 of the instruction code with the refill instruction 415a added at the end of code block 1. When the execution engine executes the refill instruction 415a, new instructions may be loaded into the instruction buffer 450 using, for example, a DMA engine as described above.

After the refill instruction 415a is executed by the execution engine, the instruction buffer 450 may be filled with code block 2 of the instruction code with the refill instruction 415b added at the end of code block 2, as shown in FIG. 4B. After the refill instruction 415b is executed, the instruction buffer 450 may be filled with code block 3 of the instruction code with the refill instruction 415c added at the end of code block 3, as shown in FIG. 4C. After the refill instruction 415c is executed, the instruction buffer 450 may be filled with code block 4 of the instruction code with the refill instruction 415d added at the end of code block 4, as shown in FIG. 4D. The above-described process may be performed continuously until there are no more instructions to be loaded into the instruction buffer.

FIGS. 5A-5E illustrate an example of refilling an instruction buffer 550. A head pointer 530 and a tail pointer 520 may be maintained for the instruction buffer 550. The tail pointer 520 may indicate the next instruction in the instruction buffer 550 to be executed by the execution engine. The head pointer 530 may indicate the point at which new instructions are added to the instruction buffer 550. The head pointer 530 and the tail pointer 520 may be used to determine the next instruction to be executed, whether additional instructions may be added, and whether all instructions have been executed. For example, a range 555 may be defined as the distance between the head pointer 530 and the tail pointer 520, and may be used to determine whether additional instructions may be added to the instruction buffer 550.

Figure 5A:
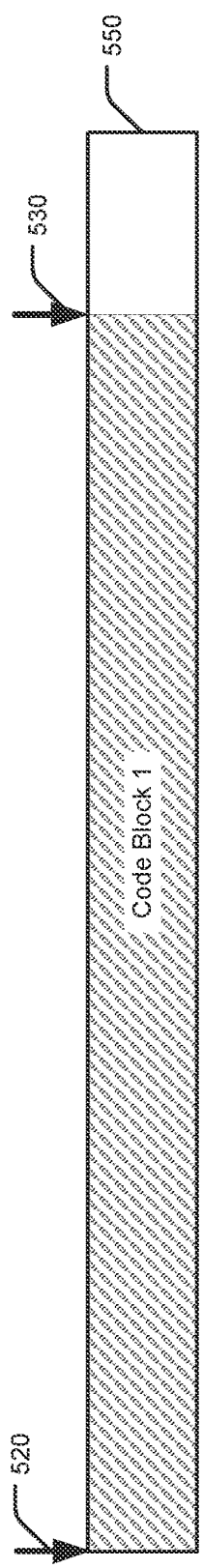
FIGS. 5A-5E illustrate an example of refilling an instruction buffer.
Figure 5B:
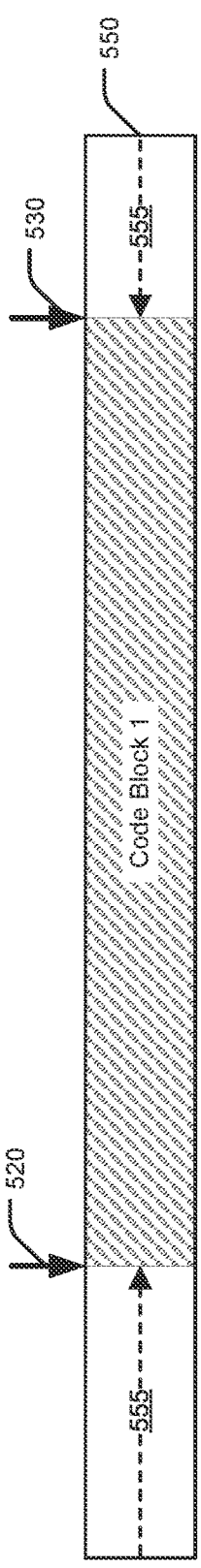

As shown in FIG. 5A, to perform the user function, the instruction buffer 550 may first be filled with code block 1 of the instruction code. Before the execution of code block 1, tail pointer 520 may point to instruction 0 of the instruction buffer 550 and the head pointer 530 may point near the last instruction in the instruction buffer 550. When the execution engine executes instructions in code block 1, the tail pointer 520 may be increased by 1 (e.g., by 4 bytes if each instruction includes 4 bytes) each time an instruction is read by the instruction decoder. The head pointer 530 may remain pointed near the last instruction in the instruction buffer 550. After a certain time period, the tail pointer 520 may point to an instruction within the instruction buffer 550 as shown in FIG. 5B. Thus, the instruction buffer 550 may include a range 555 from the head pointer 530 to the tail pointer 520. The range 555 may include instructions that have already been executed and thus can be replaced by new instructions to be executed.

An external entity, such as a controller or a CPU, may read the tail pointer 520 and the head pointer 530 to determine whether new instructions need to be loaded into the instruction buffer 550. For example, the external entity may determine the size of the range 555 in the instruction buffer 550 that may be available for storing new instructions, based on the values of the tail pointer 520 and the head pointer 530. If the size of the range 555 is greater than a threshold value, such as greater than 25% of the size of the instruction buffer 550, an operation to load new instructions into the range 555 of the instruction buffer 550 may be triggered by the external entity. The new instructions may be loaded into the range 555 using, for example, a DMA engine as described above. While the new instructions are being loaded into the instruction buffer 550, remaining instructions in code block 1 of the instruction code may continue to be executed by the execution engine.

Figure 5C:
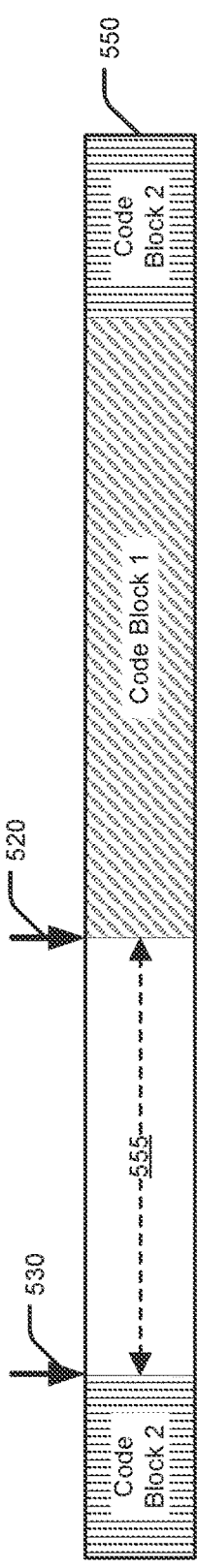
Figure 5D:
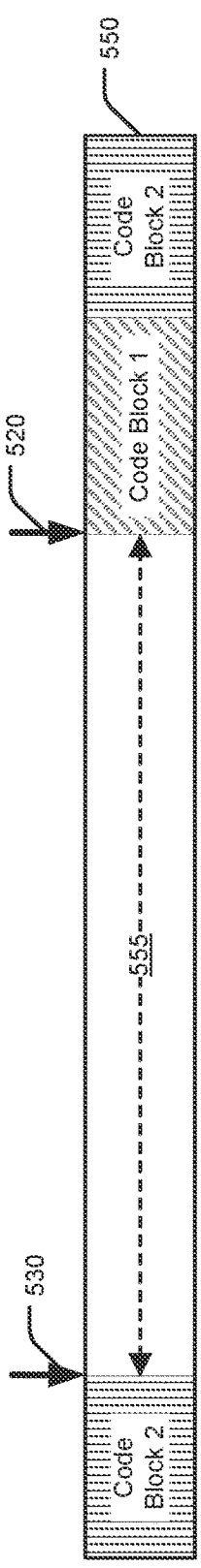
Figure 5E:
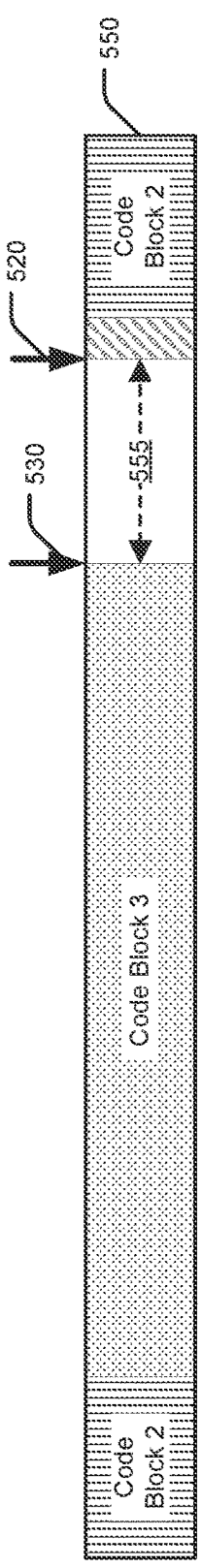

As shown in FIG. 5C, after a certain time period, code block 2 of the instruction code may be loaded into the instruction buffer 550, and the head pointer 530 may point to the end of the new instructions. The tail pointer 520 may point to an instruction of code block 1 as shown in FIG. 5C. When the size of the range 555 reaches the threshold value again (for example, as shown in FIG. 5D), another operation to load new instructions into the range 555 may be triggered by the external entity as described above. Thus, more instructions of the instruction code may be loaded into the instruction buffer 550, while the execution engine continues to execute instructions in code block 1 of the instruction code. After a certain time period, the head pointer 530 may point to the end of the new instructions and the tail pointer 520 may point to the next instruction to be executed in code block 1 as shown in FIG. 5E.

The above-described process may be performed continuously until there are no more instructions to be loaded into the instruction buffer and the value of the head pointer is equal to the value of the tail pointer. During the process, the external entity may continue to (e.g., periodically) read the tail pointer 520 and the head pointer 530, determine if new instructions need to be loaded into the instruction buffer, and trigger the loading of the new instructions into the instruction buffer. Using the external entity to read and compare the instruction pointers may use a lot of processing time (e.g., CPU time) and/or hardware resources, or may not be fast enough to determine the time for the next refill.

Figure 6:
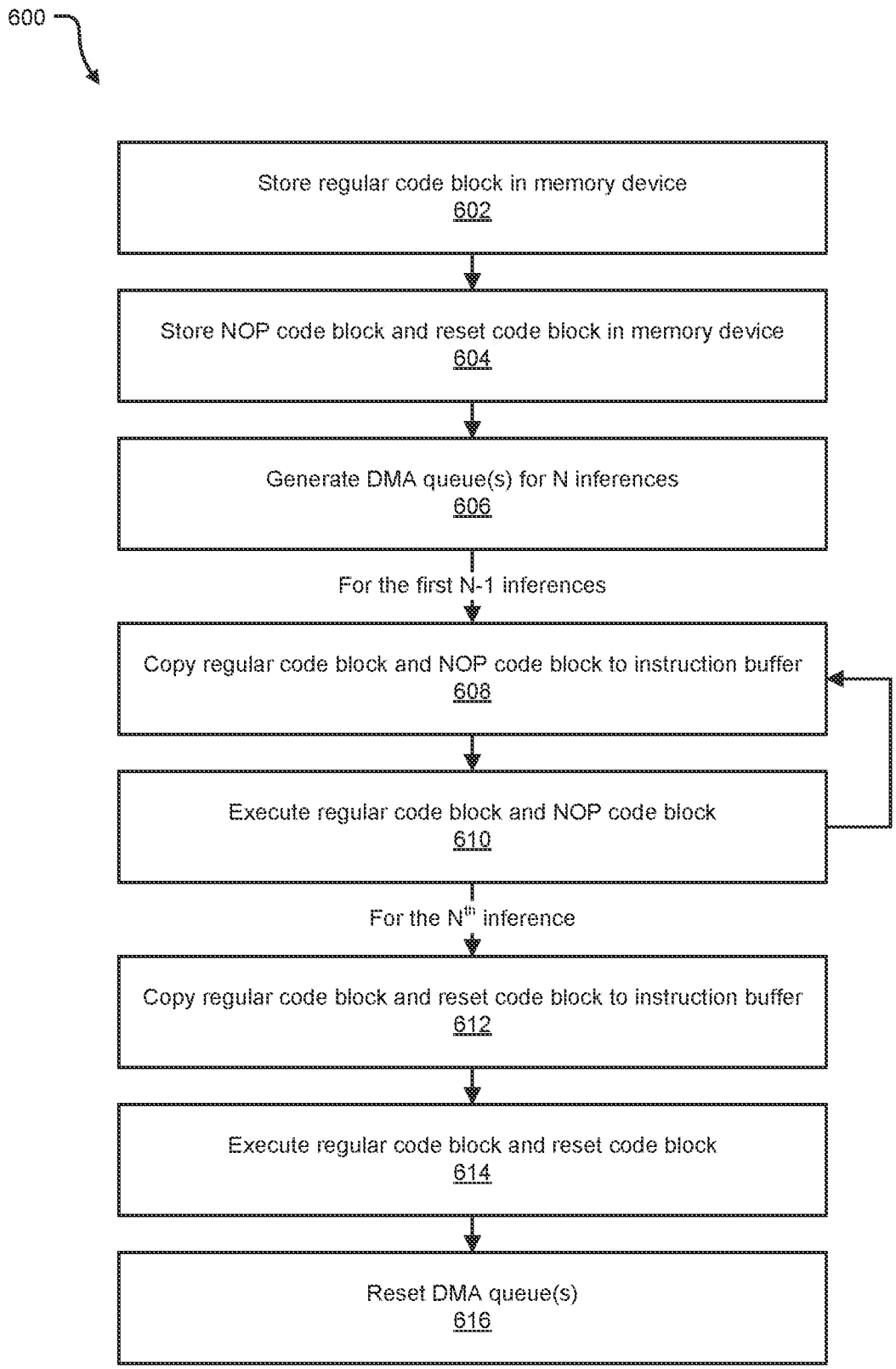
FIG. 6 illustrates a flowchart illustrating an example of a method for enabling execution of N inferences on an execution engine.

FIG. 6 illustrates a flowchart of an example of a method 600 for enabling execution of N inferences on an execution engine. One or more steps of the method 600 may be performed in an order different than the illustrated embodiment, and one or more steps of the method 600 may be omitted during performance of the method 600. One or more steps of the method 600 may be performed by the various components described herein.

At step 602, a regular code block containing instruction code for performing a single inference using a trained neural network is stored in a memory device. In some embodiments, the memory device is a DRAM device. In some embodiments, the memory device is accessible by a DMA engine. The regular code block may include instruction code that was compiled by a compiler based on a description of the neural network and subsequently transferred to the memory device.

At step 604, one or both of a NOP code block and a reset code block are stored in the memory device. In some embodiments, the reset code block may include instructions such that execution of the reset code block causes one or more DMA queues to reset. In some embodiments, the NOP code block includes instructions such that execution of the NOP code block causes the execution engine to reset. In some embodiments, one or both of the NOP code block and the reset code block may be generated and stored by a runtime driver operating on a host system.

At step 606, one or more DMA queues are generated. In some embodiments, the DMA queues are filled with multiple entries to enable N inferences to be performed. In some embodiments, an instruction DMA queue is generated and/or an I/O DMA queue is generated. In some embodiments, the instruction DMA queue may include entries that, when executed by the DMA engine, cause the DMA engine to copy both the regular code block and an additional code block to the instruction buffer of the execution engine for each of the N inferences. In some embodiments, the I/O DMA queue may include entries that, when executed by the DMA engine, cause the DMA engine to properly handle input and output data by, for example, transferring output data of one section of instruction code to become input data for another section of instruction code.

At step 608, the DMA engine copies both the regular code block and the NOP code block to the instruction buffer for each of the first N−1 inferences of the N inferences. In some embodiments, the regular code block is split into multiple sections, with each section being copied to the instruction buffer sequentially. At step 610, the execution engine executes both the regular code block and the NOP code block for each of the first N−1 inferences. In some embodiments, steps 608 and 610 may be performed concurrently with each other. For example, executing portions of the regular code block may trigger the DMA engine to copy other portions of the regular code block to the instruction buffer.

At step 612, the DMA engine copies both the regular code block and the reset code block to the instruction buffer for the $N^{th}$ inference. At step 614, the execution engine executes both the regular code block and the reset code block for the $N^{th}$ inference. In some embodiments, steps 612 and 614 may be performed concurrently with each other. For example, executing portions of the regular code block may trigger the DMA engine to copy other portions of the regular code block to the instruction buffer.

At step 616, one or both of the DMA queues are reset. This may include clearing the entries in the DMA queues, generating new entries in the DMA queues for an additional N inferences, and/or resetting the head pointer and tail pointer to become aligned with the first entry in the DMA queues.

Figure 7:
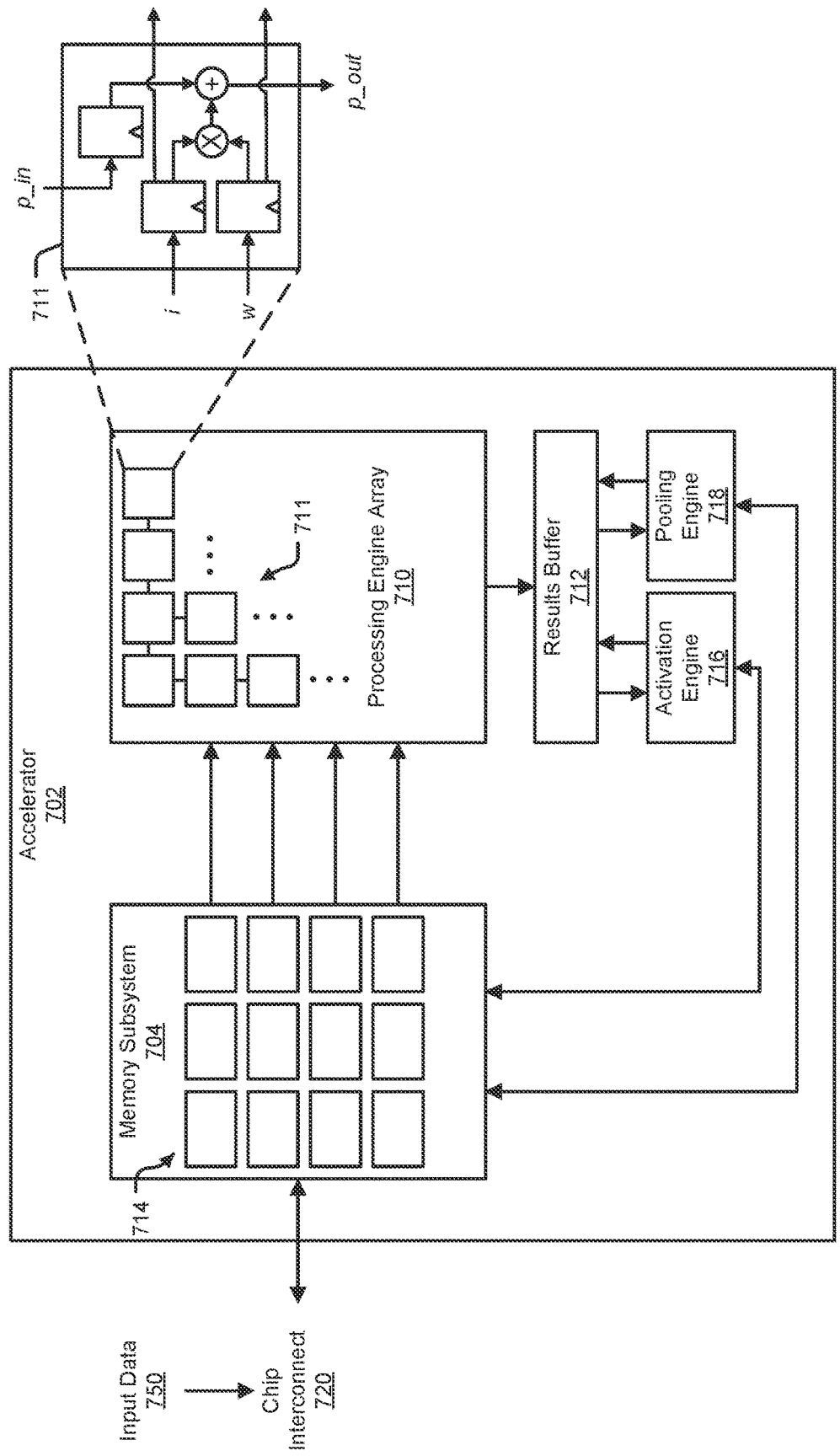
FIG. 7 is a block diagram illustrating an example of an integrated circuit device.

FIG. 7 is a block diagram illustrating an example of an integrated circuit device that can include an execution engine in accordance with the present disclosure. The example of FIG. 7 illustrates an accelerator 702. In various examples, the accelerator 702, for a set of input data (e.g., input data 750), can execute computations using a processing engine array 710, an activation engine 716, and/or a pooling engine 718. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716 and the pooling engine 718 can include multiple execution channels, each of which can be separate memory clients. The memory banks 714 can be implemented, for example, using SRAM.

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 428 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

Herein, the activation engine 716 and the pooling engine 718 may be referred to collectively as execution engines. The processing engine array 710 is another example of an execution engine. Another example of an execution engine is a DMA engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
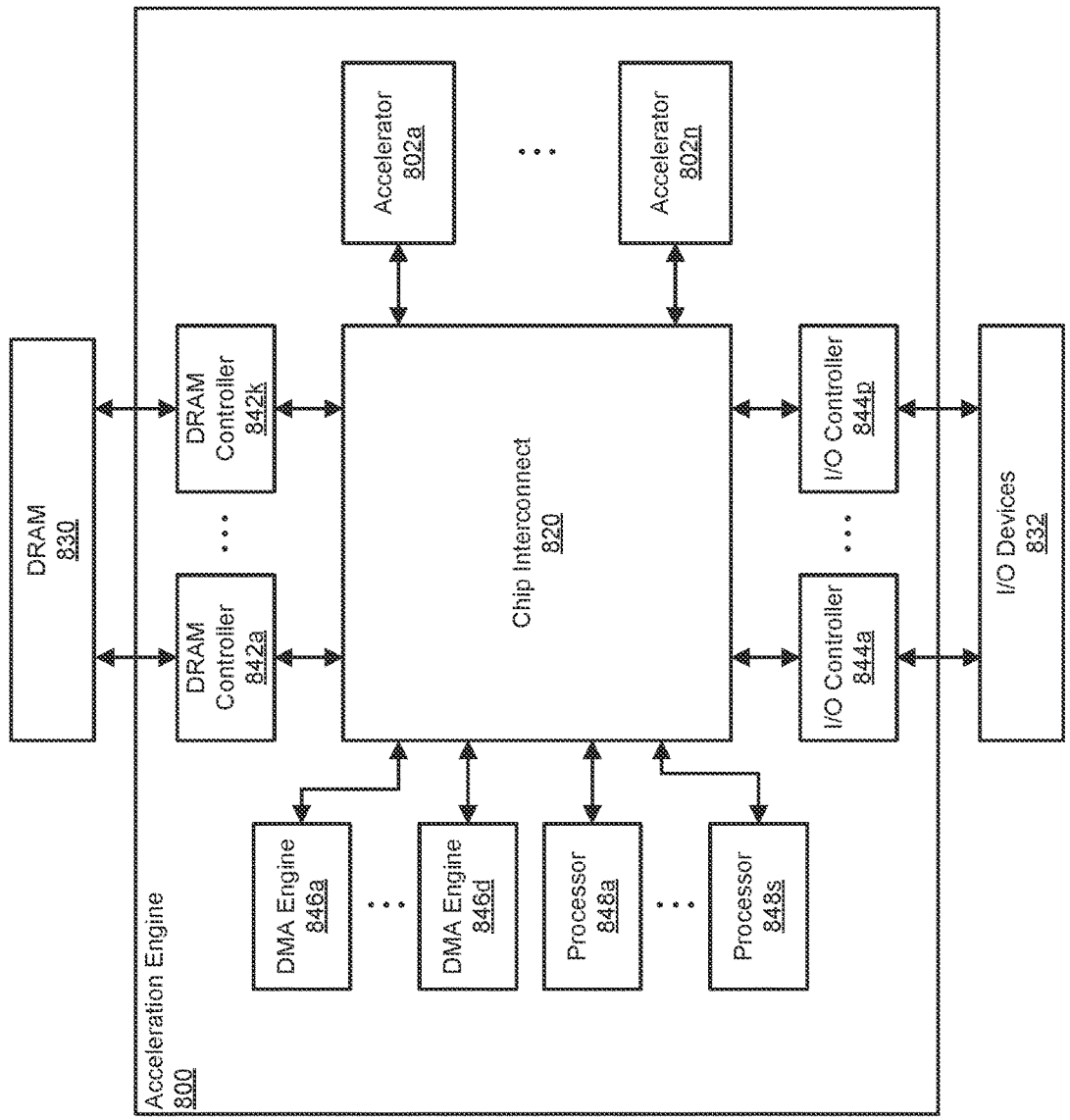
FIG. 8 includes a block diagram that illustrates an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 7.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueuing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-

848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
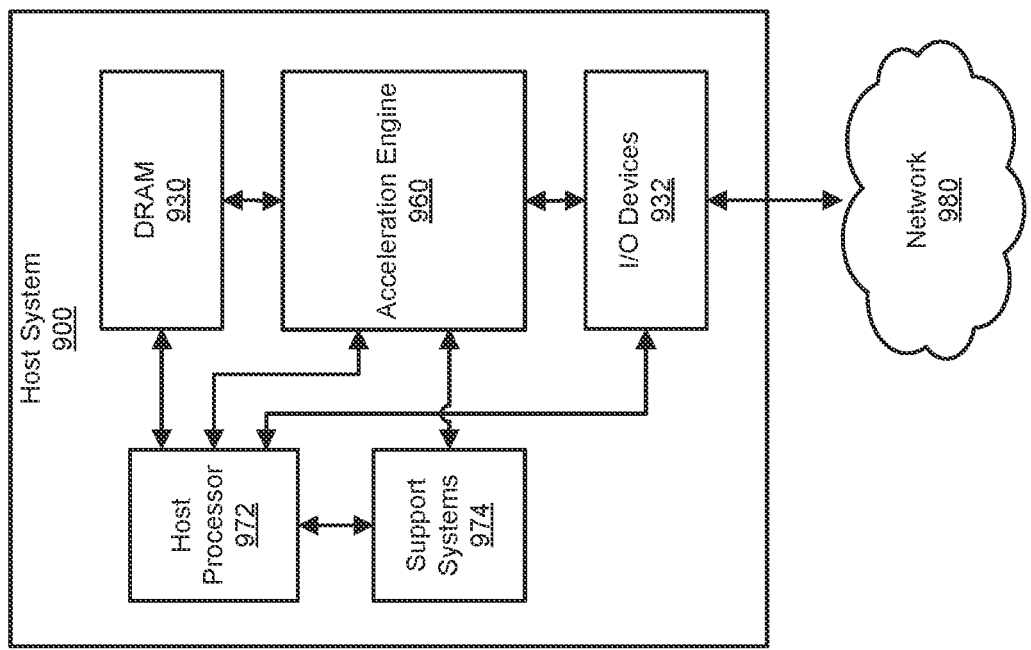
FIG. 9 includes a block diagram that illustrates an example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCIe or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   executing, by a direct memory access (DMA) engine, a set of entries stored at a DMA queue, wherein a first portion of the set of entries are associated with a first inference and a second portion of the set of entries are associated with a second inference;
   in response to executing the first portion of the set of entries, copying a regular code block and a first additional code block from a memory device to an instruction buffer for execution on an execution engine, wherein the regular code block includes instruction code for a single inference; and
   in response to executing the second portion of the set of entries, copying the regular code block and a second additional code block from the memory device to the instruction buffer for execution on the execution engine, the second additional code block being different than the first additional code block.

2. The method of claim 1, wherein a third portion of the set of entries are associated with a third inference, and wherein the method further comprises:
   after executing the first portion of the set of entries and before executing the second portion of the set of entries, and in response to executing the third portion of the set of entries, copying the regular code block and the first additional code block from the memory device to the instruction buffer for execution on the execution engine.

3. The method of claim 1, wherein the first additional code block is a no-operation (NOP) code block.

4. The method of claim 1, wherein the second additional code block is a reset code block that, when executed on the execution engine, causes resetting of the DMA queue.

5. The method of claim 4, wherein the reset code block, when executed on the execution engine, further causes resetting of an input/output (I/O) DMA queue, wherein the I/O DMA queue is separate from the DMA queue and includes entries that, when executed by the DMA engine, cause the DMA engine to copy I/O data for each of the first inference and the second inference.

6. The method of claim 1, wherein the execution engine includes a convolution engine, an activation engine, a pooling engine, or a general-purpose processing engine.

7. The method of claim 1, wherein the instruction code is split into sections of code, and wherein the DMA engine copies each of the sections of code sequentially to the instruction buffer for each of the first inference and the second inference.

8. An apparatus comprising:
an execution engine coupled to an instruction buffer;
a memory device configured to store a regular code block, a first additional code block, and a second additional code block, the second additional code block being different than the first additional code block;
a direct memory access (DMA) queue configured to store a set of entries, wherein a first portion of the set of entries are associated with a first inference and a second portion of the set of entries are associated with a second inference; and
a DMA engine configured to:
execute the set of entries;
in response to executing the first portion of the set of entries, copy the regular code block and the first additional code block from the memory device to the instruction buffer for execution on the execution engine; and
in response to executing the second portion of the set of entries, copy the regular code block and the second additional code block from the memory device to the instruction buffer for execution on the execution engine.

9. The apparatus of claim 8, wherein a third portion of the set of entries are associated with a third inference, and wherein the DMA engine is further configured to:
after executing the first portion of the set of entries and before executing the second portion of the set of entries, and in response to executing the third portion of the set of entries, copy the regular code block and the first additional code block from the memory device to the instruction buffer for execution on the execution engine.

10. The apparatus of claim 8, wherein the first additional code block is a no-operation (NOP) code block.

11. The apparatus of claim 8, wherein the second additional code block is a reset code block that, when executed on the execution engine, causes resetting of the DMA queue.

12. The apparatus of claim 11, wherein the reset code block, when executed on the execution engine, further causes resetting of an input/output (I/O) DMA queue, wherein the I/O DMA queue is separate from the DMA queue and includes entries that, when executed by the DMA engine, cause the DMA engine to copy I/O data for each of the first inference and the second inference.

13. The apparatus of claim 8, wherein the execution engine includes a convolution engine, an activation engine, a pooling engine, or a general-purpose processing engine.

14. The apparatus of claim 8, wherein the regular code block includes instruction code for a single inference, wherein the instruction code is split into sections of code, and wherein the DMA engine copies each of the sections of code sequentially to the instruction buffer for each of the first inference and the second inference.

15. A non-transitory computer-readable medium having stored therein instructions that, when executed by one or more processors, cause the one or more processors to perform operations including:
executing, by a direct memory access (DMA) engine, a set of entries stored at a DMA queue, wherein a first portion of the set of entries are associated with a first inference and a second portion of the set of entries are associated with a second inference;
in response to executing the first portion of the set of entries, copying a regular code block and a first additional code block from a memory device to an instruction buffer for execution on an execution engine, wherein the regular code block includes instruction code for a single inference; and
in response to executing the second portion of the set of entries, copying the regular code block and a second additional code block from the memory device to the instruction buffer for execution on the execution engine, the second additional code block being different than the first additional code block.

16. The non-transitory computer-readable medium of claim 15, wherein a third portion of the set of entries are associated with a third inference, and wherein the operations further comprise:
after executing the first portion of the set of entries and before executing the second portion of the set of entries, and in response to executing the third portion of the set of entries, copying the regular code block and the first additional code block from the memory device to the instruction buffer for execution on the execution engine.

17. The non-transitory computer-readable medium of claim 15, wherein the first additional code block is a no-operation (NOP) code block.

18. The non-transitory computer-readable medium of claim 15, wherein the second additional code block is a reset code block that, when executed on the execution engine, causes resetting of the DMA queue.

19. The non-transitory computer-readable medium of claim 18, wherein the reset code block, when executed on the execution engine, further causes resetting of an input/output (I/O) DMA queue, wherein the I/O DMA queue is separate from the DMA queue and includes entries that, when executed by the DMA engine, cause the DMA engine to copy I/O data for each of the first inference and the second inference.

20. The non-transitory computer-readable medium of claim 15, wherein the execution engine includes a convolution engine, an activation engine, a pooling engine, or a general-purpose processing engine.

* * * * *